May 12, 1925.
F. M. NASH
1,537,488
OPERATING MECHANISM FOR DIRIGIBLE HEADLIGHT CONSTRUCTION
Filed March 17, 1924
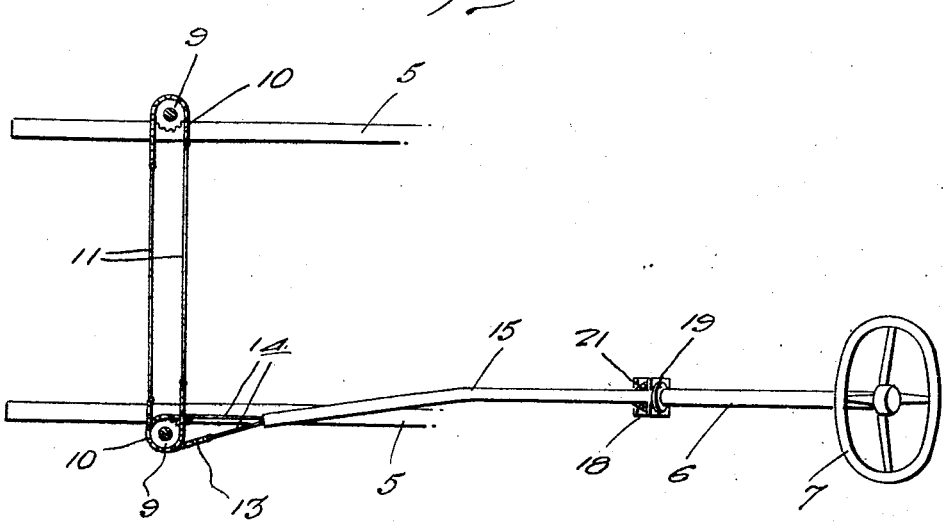
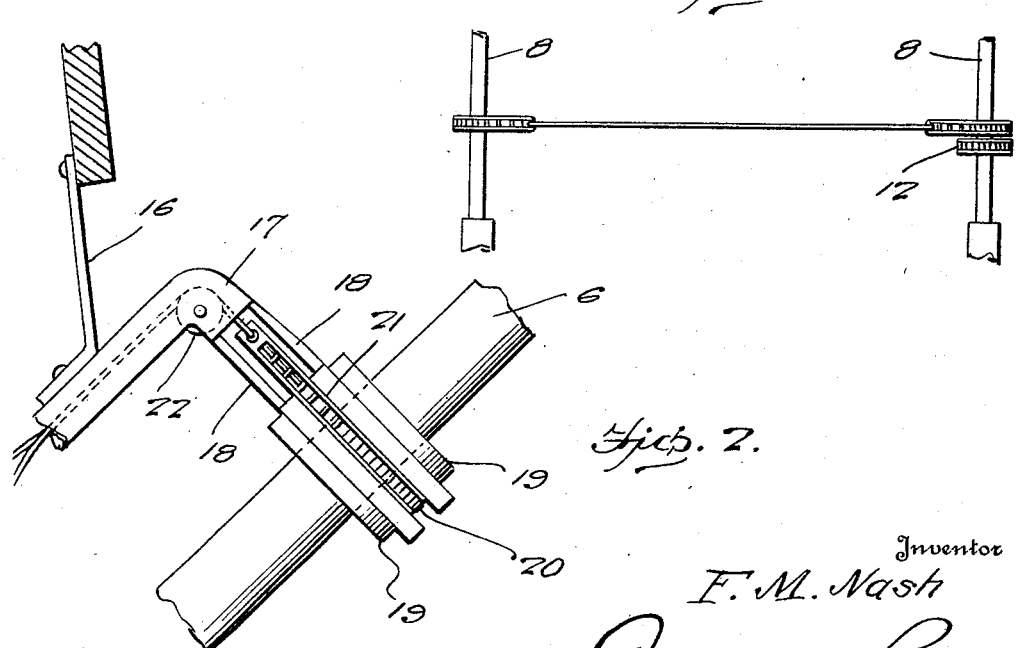
Inventor
F. M. Nash
By Clarence A. O'Brien
Attorney Patented May 12, 1925.

1,537,488

UNITED STATES PATENT OFFICE.

FRED M. NASH, OF TRINIDAD, COLORADO.

OPERATING MECHANISM FOR DIRIGIBLE HEADLIGHT CONSTRUCTION.

Application filed March 17, 1924. Serial No. 699,790.

*To all whom it may concern:*

Be it known that I, FRED M. NASH, a citizen of the United States, residing at Trinidad, in the county of Las Animas and State of Colorado, have invented certain new and useful Improvements in Operating Mechanism for Dirigible Headlight Constructions, of which the following is a specification.

This invention relates generally to dirigible headlights for automobiles, and has more particular reference to an operating mechanism for the headlights at the front of the machine that are necessarily disposed for rotation in a suitable manner, and the primary object of the invention is to provide an operating means therefor, whereby the headlights will be moved into the direction that the vehicle is being turned for manifestly directing the light rays from the headlights at all times in the path of travel of the vehicle.

One of the main objects of the invention is to provide an operating mechanism for dirigible headlights, wherein no connection is necessary to the connecting rod, spindle arms, etc., of the vehicle steering mechanism, which as is well known materially affects the proper steering of the vehicle, the present invention including a relatively simple form of operating connection with the steering post of the vehicle steering mechanism, and this in such a manner as not to materially affect the operation of the vehicle steering mechanism.

An additional and pertinent object is to substantially improve and simplify mechanisms of this general nature.

With the foregoing objects in view, and others that will become apparent as the nature of the invention is better understood, the same comprises the novel form, combination and arrangement of parts hereinafter more fully described, shown in the accompanying drawing, and claimed.

In the drawing wherein like reference characters indicate corresponding parts throughout several views:

Figure 1—is a stop plan view of a dirigible headlight operating mechanism constructed in accordance with the present invention.

Figure 2—is an enlarged fragmentary side elevational view of a portion of said operating mechanism for more clearly disclosing the operative connection between the vehicle steering post and the lamp turning means per se, and Figure 3—is a fragmentary front elevational view disclosing more clearly the inter-connection between the pair of the headlight posts of the vehicle.

Now, having particular reference to the drawing, 5—5 indicates the usual chassis bars of a motor vehicle, 6 the usual steering post, and 7 the steering wheel, whereby the vehicle may be turned as desired.

8—8 indicate the head lamp posts of the vehicle that are rotatably supported in any manner desirable at a point slightly forwardly of the usual radiator (not shown).

My invention per se constitutes the provision of sprocket wheels 9—9, that are keyed to said head lamp post 8—8 in any desirable manner, and over which are to be trained sprocket chains 10—10 of suitable length, the opposite ends of which are operatively connected together by suitable cables 11—11, whereby when one of the sprocket wheels upon its lamp post is operated, motion will be imparted to the other of said lamp post.

The left hand lamp post is further equipped at a point beneath its sprocket gear 9 with another sprocket gear 12, around which is passed a length of sprocket chain 13, that has its ends connected to a pair of cables 14—14, that extend rearwardly and upwardly through an inclined metallic tube 15, that is supported preferably in the manner indicated by the reference character 16 in Figure 2. The upper end of this tube 15 is provided with a right angularly bent portion 17 that terminates in a pair of substantially square-shaped base plates 18—18 that are formed with a relatively large opening, through which the steering post 6 is passed, these plates being limited from sliding movement upon said post through the medium of collars 19—19 keyed to said post upon the outer sides of said plates 18—18.

Intermediate these plates the steering post 6 is equipped with a sprocket gear 20, over which is passed a length of sprocket chain 21, that has its ends connected to the opposite ends of said cables 14—14, it being noticed in this instance that these cables pass over a pulley 22 at the connecting point between the tube 15 and its right angularly bent portion 17.

It will therefore be seen that a turning of the steering post 6 will manifestly control the actuation of the chain 21 for thereby actuating the chain 13 around the sprocket gear 12 of the left hand lamp post for manifestly stopping this post in its support and due to the operative connection between the posts 8—8, a simultaneous movement of the other lamp posts will be occasioned in a similar direction for thereby directing the light rays from the headlamps (not shown) into the path of travel of the vehicle at all times, for obviously allowing the driver of the vehicle to view the road, and especially at points where the same deviates from a straight path.

The specific operation together with numerous advantages of a dirigible headlight mechanism of this character will be at once appreciated by those skilled in the art, but even though I have herein shown and described the most practical embodiment of the invention with which I am at this time familiar, it is nevertheless to be understood that minor changes may be made in the invention without departing from the spirit and scope of the appended claim.

Having thus described my invention, what I claim as new and desire to secure by Letters-Patent is:

In a dirigible headlight structure, a pair of shafts spaced from each other and journaled for turning movement, a sprocket wheel carried by each shaft, chain sections having links provided with openings adapted to receive the teeth of the sprocket wheels, one chain section trained about each sprocket wheel, the end portions of the chain sections, upon the respective sprocket wheels being disposed toward each other in opposite directions, table sections connected at their ends with the oppositely disposed ends of the chain sections and bridging the space between the ends of said chain sections, a steering column, a sprocket on the steering column, a chain section about the sprockets on the steering column, a guide tube of angular construction, a pulley in the curved portion of the guide tube, a second sprocket on one of the shafts, a chain section disposed about the last mentioned sprocket, cable sections connected to the ends of the last mentioned sprocket and to the end of the chain section trained about the sprocket on the steering column, and also trained over the pulley.

In testimony whereof I affix my signature.

FRED M. NASH.